United States Patent [19]

Chaumont et al.

[11] 4,263,401
[45] Apr. 21, 1981

[54] THERMOPLASTIC, ELASTOMERIC POLYSTYRENE/DIORGANOPOLYSILOXANE BLOCK COPOLYMERS

[75] Inventors: Philippe Chaumont, La Wantzenau; Jean Herz, Saint-Pierre; Christian Prud'Homme, Lyons, all of France

[73] Assignee: Rhone-Poulenc Industries, Paris, France

[21] Appl. No.: 74,477

[22] Filed: Sep. 11, 1979

[30] Foreign Application Priority Data

Sep. 13, 1978 [FR] France .................. 78 26245

[51] Int. Cl.$^3$ ................ C08F 297/02; C08G 77/42
[52] U.S. Cl. ........................ 525/106; 525/100; 525/271; 525/288
[58] Field of Search ............. 525/271, 106, 288, 100

[56] References Cited

U.S. PATENT DOCUMENTS

| | | | |
|---|---|---|---|
| 3,678,126 | 7/1972 | Saam et al. ............. | 525/271 |
| 4,080,400 | 3/1978 | Martin ..................... | 525/271 |
| 4,145,508 | 3/1979 | Bargain et al. .......... | 525/478 |

Primary Examiner—Wilbert J. Briggs, Sr.
Attorney, Agent, or Firm—Burns, Doane, Swecker & Mathis

[57] ABSTRACT

Thermoplastic, elastomeric polystyrene/diorganopolysiloxane block copolymers having the structural formula:

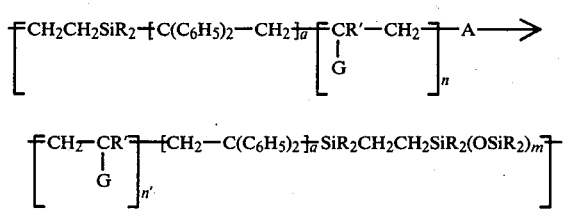

wherein each R, which may be the same or different, is selected from the group consisting of methyl, ethyl, n-propyl, phenyl and 3,3,3-trifluoropropyl; each R', all of which are the same, is hydrogen or methyl; A is a divalent hydrocarbon radical, free of aliphatic unsaturation, having from 6 to 45 carbon atoms; each G, which may be the same or different, is a radical selected from the group consisting of those of the structural formulae:

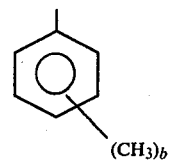

wherein b is 0, 1, 2 or 3,

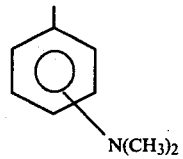

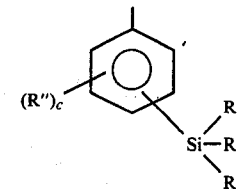

wherein R" is hydrogen, methyl or —Si R$_3$, c is 0, 1 or 2 and R is as above defined; each a, all of which are the same, is 0 or 1; and n and n', which may be the same or different, represent any numbers, the sum of which is between 20 and 500, and m is any number between 1 and 1,500, are prepared by anionic "styrene" polymerization, chain extension with a vinylchlorosilane, and, ultimately, hydrosilylation.

9 Claims, No Drawings

THERMOPLASTIC, ELASTOMERIC POLYSTYRENE/DIORGANOPOLYSILOXANE BLOCK COPOLYMERS

BACKGROUND OF THE INVENTION

1. Field of the Invention

The present invention relates to novel thermoplastic, elastomeric block copolymers which comprise a plurality of recurring units, each of which recurring units comprising a rigid polystyrene block and a flexible diorganopolysiloxane block, such blocks being joined together via a non-hydrolyzable chemical bond.

The invention also relates to a process for the preparation of such block copolymers by hydrosilylation.

2. Description of the Prior Art

Thermoplastic elastomers comprising polystyrene blocks and diorganopolysiloxane blocks are known to the art. Compare U.S. Pat. Nos. 3,678,125 and 3,678,126. Same are prepared via a multi-stage process, for example:

(1) The anionic polymerization of styrene, or suitable derivatives thereof, such as α-methylstyrene, in a solvent medium with the aid of an organic dilithium compound;

(2) Contacting, at a temperature below −50° C., the polystyrene polymer prepared in stage (1), bearing a C-Li group at each end of its chain, with a minor amount of a hexaorganocyclotrisiloxane;

(3) Adding the hexaorganocylotrisiloxane (in an amount sufficient to obtain the desired molecular weight of the diorganopolysiloxane block) to the polymer obtained in stage (2), bearing a Si-O-Li group at each of its chain, and then heating same in order to effect anionic polymerization of the hexaorganocyclotrisiloxane;

(4) Next coupling the polystrene-polydiorganosiloxane copolymer prepared in stage (3) with a diorganodichlorosilane; and (5) Washing, with water, the copolymer obtained in stage (4), in order to replace the terminal Si-O-Li groups by Si-OH groups, and, simultaneously, to eliminate lithium chloride, or, alternatively, by reacting a silane of the formula $T_3SiCi$ with such Si-O-Li moieties to form terminal groups Si-O-SiT$_3$ (T = hydrocarbon radical).

The aforesaid process, however, is not easy to carry out on an industrial scale. In fact, it requires considerable time, strict supervision throughout the various stages and the use, in stage (1), of a very expensive organic dilithium compound. This dilithium compound is essential because it effects formation, in stage (2), of the terminal groups Si-O-Li which will ensure, in stage (3), the anionic polymerization of the hexaorganocyclotrisiloxane without causing rearrangements or scissions of the polysiloxane chains. Therefore, the terminal groups Si-O-Na or Si-O-K, which could be obtained from dipotassium or disodium organic compounds which are more readily available and are considerably less expensive, cannot be used in this multi-stage process.

A further disadvantage of the noted prior art process also arises from the lack of reactivity of the hexaorganocyclotrisiloxane with respect to the groups

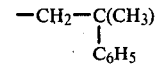

Li blocking the chain of the α-methylstyrene polymers.

Since these living α-methylstyrene polymers are not stable above −40° C., and since they only react with the hexaorganocyclotrisiloxane above this temperature to form the terminal groups Si-O-Li, it is necessary to add styrene thereto before they are brought into contact with the hexaorganocyclotrisiloxane, so as to include small polystyrene blocks at each end of their chain. This technique makes it possible, ultimately, to operate at a temperature above −40° C. without depolymerization taking place, but it has the disadvantage of introducing heterogeneities into the chain of the α-methylstyrene polymers.

Accordingly, serious need exists in the art to enable manufacture of other kinds of thermoplastic elastomers comprising polystyrene blocks and diorganopolysiloxane blocks by a simpler and yet more reliable process, desirably by using not only organic dilithium compounds, but also organic disodium and dipotassium compounds.

Cf. *Farbe Und Lack*, 70, No. 4, 249–258 (1964) wherein the preparation of a low molecular weight copolymer is described, such copolymer having poor mechanical properties and being prepared by adding an allyldimethylsiloxane terminated polystyrene to a dihydrogenopolydimethylsiloxane.

SUMMARY OF THE INVENTION

Accordingly, a major object of the present invention is the provision of novel thermoplastic elastomers which are characterized in that same are comprised of a plurality of recurring units corresponding to the average general structural formula F:

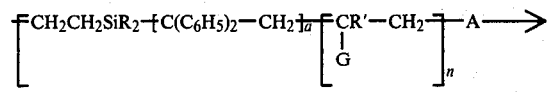

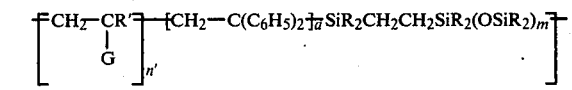

in which: the symbols R, which are identical or different, represent methyl, ethyl, n-propyl, phenyl or 3,3,3-trifluoropropyl, the symbols R', which are identical, represent hydrogen or methyl, the symbol A represents a divalent hydrocarbon radical, devoid of aliphatic unsaturation, having from 6 to 45 carbon atoms, the symbols G, which are identical or different, represent radicals of the formulae:

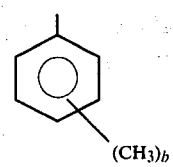

(wherein b is 0, 1, 2 or 3)

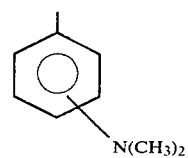

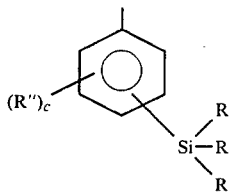

(wherein R" is hydrogen, methyl or —Si R$_3$; c is 0, 1 or 2; and R is as above defined); the symbols a, which are identical, represent zero or 1, the symbols n and n', which are identical or different, represent any numbers, the sum of which is between 20 and 500, and the symbol m represents any number between 1 and 1,500.

DETAILED DESCRIPTION OF THE INVENTION

The divalent hydrocarbon radical represented by the symbol A is preferably selected from among naphthylene radicals, biphenylene radicals and alkylene or polyalkylene radicals which either may or not be substituted by aromatic rings.

Radicals of this type, which are mentioned by way of illustration, are those corresponding to the formulae below:

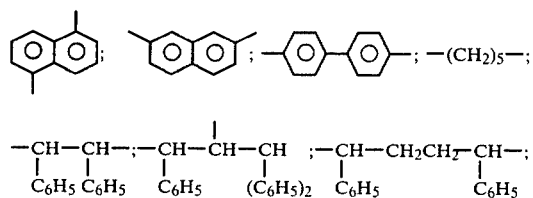

$$-CH-CH_2-CH_2-CH-;$$
$$\phantom{-CH-}|\phantom{CH_2-CH_2-}|$$
$$\phantom{-CH-}C_6H_2(CH_3)_3 \phantom{CH_2-}C_6H_2(CH_3)_3$$

$$-C(CH_3)-CH_2-CH_2-C(CH_3)-C(CH_3)-CH_2-CH_2-C(CH_3)-$$
$$\phantom{-C}|\phantom{CH_3-CH_2-CH_2-C}|\phantom{CH_3-C}|\phantom{CH_3-CH_2-CH_2-C}|$$
$$\phantom{-C}C_6H_5 \phantom{CH_3-CH_2-CH_2-C}C_6H_5 \phantom{CH_3}C_6H_5 \phantom{CH_3-CH_2-CH_2-C}C_6H_5$$

The latter structural formula likely is the linkage referred to as α-methylstyrene tetramer; same is described in articles by C. L. Lee, J. Smid and M. Szwarc [*J. Phys. Chem.*, 66, 904 (1962)] and M. N. Berger, J. K. Boulton, B. W. Brooks and M. J. Evans [*Chem. Comm.*, 1, 8 (1967)].

The various symbols included in the formula F have the following preferred definitions: the symbols R represent methyl radicals, the symbol A represents the naphth-1,5-ylene radical, the α-methylstyrene tetramer or radicals of the formulae:

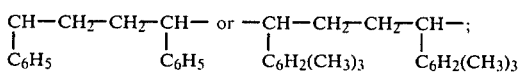

the symbols G represent:
(i) phenyl radical;
(ii) trimethylsilylphenyl radical; bis(trimethylsilyl)phenyl radical and tris(trimethylsilyl)phenyl-radical;
(iii) and solely in the case where the symbols R' are hydrogen atoms, radicals of formulae:

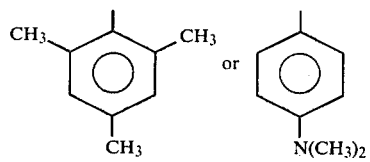

the symbols a represent zero, the symbols n and n' represent any numbers, the sum of which is between 30 and 400, and the symbol m represents any number between 10 and 1,200.

Thermoplastic elastomers which are noted as illustrative are those in which the recurring units corresponding to the structural formulae below:

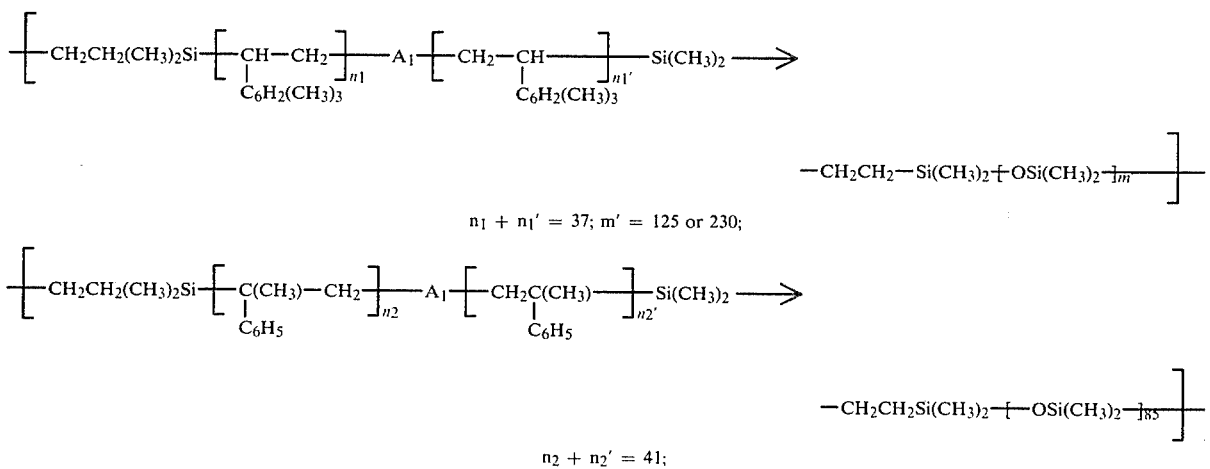

$n_1 + n_1' = 37$; $m' = 125$ or $230$;

$n_2 + n_2' = 41$;

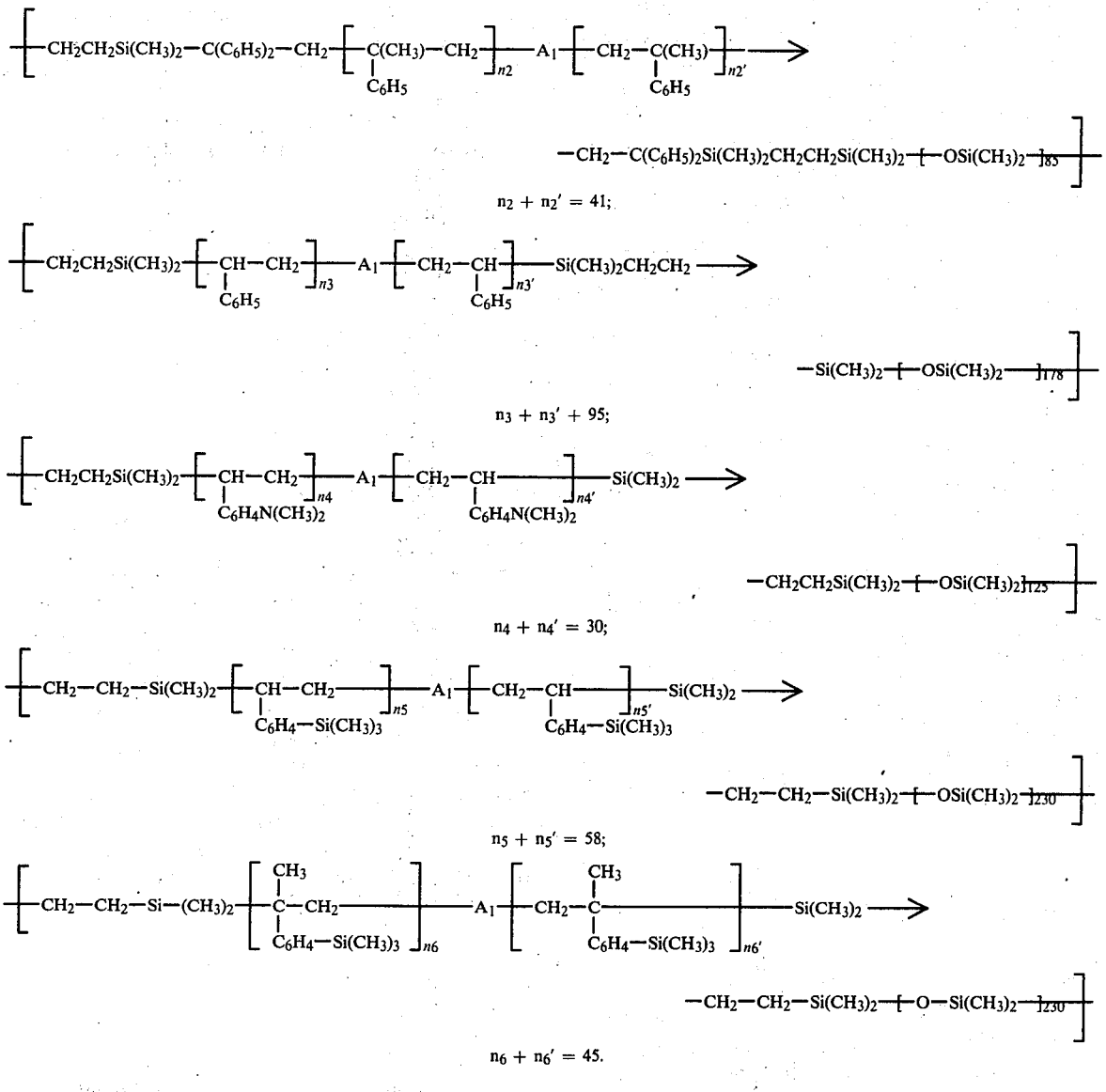

$n_2 + n_2' = 41;$ $n_3 + n_3' + 95;$ $n_4 + n_4' = 30;$ $n_5 + n_5' = 58;$ $n_6 + n_6' = 45.$

In all of the aforementioned formulae, $A_1$ is the α-methylstyrene tetramer.

The process for the preparation of the thermoplastic elastomers having the structure formula F is readily carried out in 3 stages.

The first stage consists of the anionic polymerization of a monomer or several monomers of the general formula $CGR'=CH_2$. Particular monomers which are mentioned by way of examples are styrene or one of its derivatives selected from among (1) α-methylstyrene, (2) styrenes substituted on the phenyl nucleus by 1, 2 or 3 methyl radicals (assuming that the vinyl radical of the substituted styrenes is in the 1-position on the benzene), such as 2-methylstyrene, 3-methylstyrene, 4-methylstyrene, 2,4-dimethylstyrene, 2,5-dimethylstyrene, 3,4-dimethylstyrene, 3,6-dimethylstyrene, 2,4,5-trimethylstyrene and 2,4,6-trimethylstyrene, (3) styrenes substituted on the phenyl nucleus by a dimethylamino or diethylamino radical, such as 4-dimethylaminostyrene and 3-diethylaminostyrene, and (4) styrenes substituted on the phenyl nucleus by 1, 2, or 3 silyl radical—Si $R_3$; e.g., styrene; α-methylstyrene; 2,4,6-trimethylstyrene(-vinylmesitylene); 4-dimethylaminostyrene; p-trimethylsilylstyrene; bis(trimethylsilyl)-3,5-styrene; p-trimethylsilyl-α-methylstyrene.

The anionic polymerization takes place in anhydrous organic solvents, at a temperature which is below $-30°$ C. but rarely below $-85°$ C., using an initiator of the formula $A(M)_2$. The symbol A is as above defined in relation to the formula F and the symbol M represents an alkali metal such as potassium, sodium or lithium, preferably potassium.

The organic solvents employed are selected from among linear, branched or cyclic organic ethers, such as dimethyl ether, diethyl ether, diisopropyl ether, dibutyl ether and tetrahydrofuran, or from among glycol diethers such as 1,2-dimethoxyethane.

The amount of solvent employed represents from 60 to 98% of the weight of the reaction medium; it depends on the solubility of the polymers in this medium and on the temperature at which the polymerization is to be carried out.

The initiators of the formula $A(M)_2$ are preferably selected from among oligomers comprising dicarboanionic sites with potassium or sodium counter-ions.

The preparation of this type of initiator is well known; it is described, for example, in the article by C. L. Lee, J. Smid and M. Szwarc, published in *Trans. Farad. Soc.*, 59, 1,192 (1963), and in the article of G. Greber, E. Reese and A. Balciunas, published in *Farbe Und Lack*, 70, No. 4,249 (1964).

Thus, same can be obtained by bringing potassium or sodium, in an organic ether medium, into contact with the styrene monomers, the ratio of alkali metal/monomers varying from about 0.5 to 2.

Same can also be obtained under the same operating conditions by utilizing naphthalene-potassium or naphthalene-sodium in place of the potassium or sodium.

Among the oligomers comprising dicarboanionic sites, the dipotassium or disodium tetramer of α-methylstyrene and the dimers of the formulae:

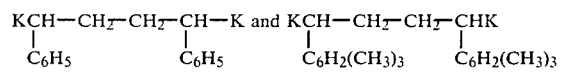

are illustrative and representative.

The initiators can also be selected from among the organic dilithium compounds, such as dilithiostilbene, 1,5-dilithionaphthalene and 1,5-dilithiopentane.

The preparation of these dilithium compounds is known and is described, for example, in British Pat. Specifications Nos. 906,315 and 972,246.

The initiators can be prepared in a different reactor from that in which the anionic polymerization is to take place and, if desired, well before this polymerization, or, alternatively, in such reactor at the very moment of polymerization.

The molar ratio of styrene monomer/initiator largely determines the molecular weight of the polymers to be prepared. This ratio can vary over a broad range of values, for example, from 20 to 500, affording number average molecular weights ranging from 2,000 to 75,000.

However, so that the polymerization reaction develops in an optimum manner (having a high degree of conversion of monomers to polymers, for example, of more than 90%), the ratio of monomer/initiator is preferably between 30 and 400, affording number average molecular weights ranging from 3,000 to 60,000.

The polymerization time depends mainly on the structure of the monomers; it can, therefore, be but a few minutes, in the case of styrene, or several hours, in the case of vinylmesitylene which possesses a sterically hindered phenyl nucleus.

The living polymers obtained in this first stage correspond to the formula $F_1$:

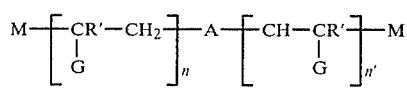

in which the symbols R', A, G, n, n' and M are as above defined with respect to the formula F.

Such polymers typically are not very stable at ambient temperature; it is, therefore, recommended to bring same into contact with organochlorosilanes of the formula $CH_2=CH-R_2SiCl$ (R having the meaning given above), at the rate of at least 1 mol of organochlorosilanes per gram-atom of the alkali metals M, as soon as the preparation of these living polymers is complete, in the actual solutions in which they were prepared and under the protection of an inert and anhydrous gas atmosphere.

This process involving the introduction of functional groups, the object of which is to replace the terminal groups

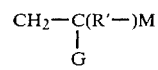

by the terminal groups

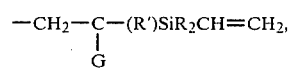

and constitutes the second stage of the preparation of the thermoplastic elastomers according to the invention.

By way of illustration, the chlorosilanes can be selected from among those having the formulae: $CH_2=CH(CH_3)_2SiCl$; $CH_2=CH(CH_3)C_2H_5SiCl$; $CH_2=CH(CH_3)C_6H_5SiCl$; $CH_2=CH(CH_3)(n-C_3H_7)SiCl$; $CH_2=CH(CH_3)CF_3CH_2\text{-}CH_2SiCl$.

Vinyldimethylchlorosilane and vinylmethylphenylchlorosilane are the preferred.

It is recommended to introduce the chlorosilanes in an excess representing, for example, 2 to 8 times the molar amount required to neutralize the alkali metals M.

In order to avoid secondary reactions, in particular those arising from the attack of the vinyl radicals of the chlorosilanes by the groups

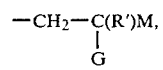

it is advisable to use as low a reaction temperature as possible in this second stage. Thus, temperatures between $-50°$ C. and $-120°$ C. are remarkably suitable for carrying out a virtually complete substitution.

If it is desired to operate at higher temperatures, it is advisable to reduce the reactivity of the group

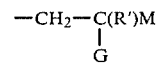

by incorporating a unit of the formula $-CH_2-C(C_6H_5)_2-$ at each end of the chain of the living polymers.

This incorporation is easily achieved by bringing at least 2 mols of diphenylethylene into contact with one mol of the living polymers of the formula $F_1$ [which corresponds to 1 mol of the initiator $A(M)_2$], at a temperature on the order of $-10°$ C. to $-70°$ C. in the reaction medium for the formation of the polymers of the formula $F_1$. The diphenylethylene does not homopolymerize; this results in the attachment of a single unit $-CH_2-C(C_6H_5)_2-$ at the end of the chain and the production of living polymers of the formula $F'_1$:

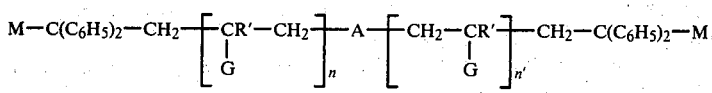

The organochlorosilanes are then introduced into the reaction medium at temperatures on the order of −30° C. to −60° C.; in this temperature range, there are no secondary side-reactions and only the substitution reaction takes place.

Whether or not the polymers possess a unit —CH$_2$—C—(C$_6$H$_5$)$_2$— at each end of their chain, the reaction involving the substitution of the alkali metal atom M by the group SiR$_2$CH=CH$_2$ is very rapid. It is, therefore, not advisable to leave the reaction mixture to stand at the abovementioned low temperatures for a period of more than 1 hour after the addition of the organochlorosilanes is complete. In general, the organochlorosilanes are introduced rapidly into the cooled solution of the living polymers, and the reaction mixture is allowed to return to ambient temperature after the cold source has been removed.

It is also possible to introduce the cooled solution of the living polymers into the organochlorosilanes, but this process very frequently requires the use of a more complex apparatus.

The polymers into which functional groups have been introduced are precipitated by diluting the reaction mixture with a compound in which the polymers are sparingly soluble, or are insoluble. For this purpose, alkanols having from 1 to 5 carbon atoms, such as methanol, ethanol, isopropanol, isobutanol and n-pentanol, are preferably used.

In practice, the reaction mixture is run into a large volume of alkanols, representing from 4 to 15 times its own volume; this results in the precipitation of the polymers which are then filtered off, washed once or several times with the alkanols and dried at a temperature on the order of 50° C. to 180° C. under a pressure which is less than or equal to atmospheric pressure.

The resulting difunctional polystyrene polymers correspond to the formula F$_2$:

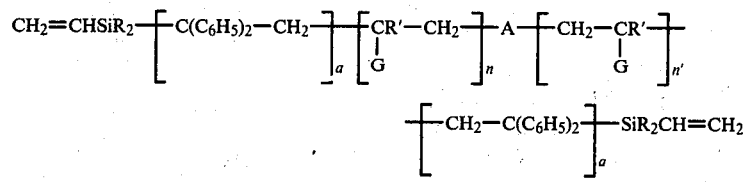

in which the symbols R, R', A, G, a, n and n' are as above defined with respect to the formula F.

These symbols in the formula F$_2$ also have the preferred meaning established for the symbols in the formula F.

Difunctional polymers which are set forth by way of illustration are those corresponding to the formulae below:

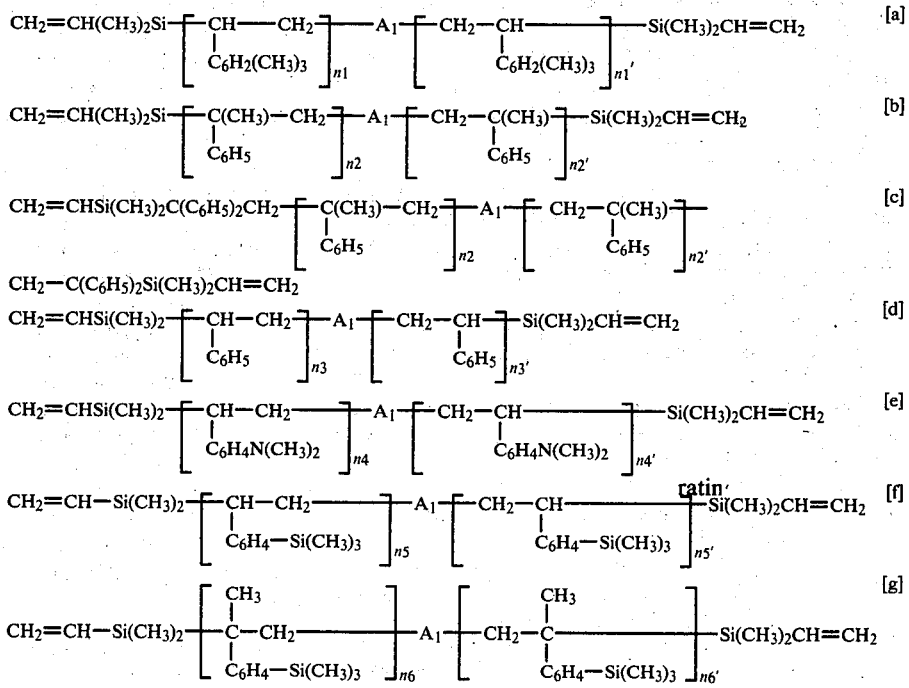

the symbols n$_1$, n'$_1$, n$_2$, n'$_2$, n$_3$, n'$_3$, n$_4$, n'$_4$ and A$_1$ having the meanings given above.

The aforesaid are whitish solids which do not have any elastomeric properties.

In the third stage of the process for the preparation of the thermoplastic elastomers, the difunctional polymers of the formula F₂ are reacted, under the typical conditions for hydrosilylation reactions, with liquid α,ω-dihydrogenopolydioganosiloxanes of the average general formula HSiR₂(OSiR₂)ₘH, in which the symbols R and m are as above defined.

These α,ω-dihydrogenopolydiorganosiloxanes are commercially available silicones; moreover, the techniques for their preparation are now well known to the art [compare U.S. Pat. Nos. 3,884,866, 4,007,229 and 4,028,208].

The molecular weight of these polysiloxanes can vary; it is determined by the nature of the substituents R and, in particular, by the value of m, which can range from 1 to 1,500, preferably from 10 to 1,200; as a result, these polysiloxanes have a variable viscosity which generally ranges from a few cP at 25° C. to 500,000 cP at 25° C.

Specific examples of these polysiloxanes which are representative are those of the formulae:

HSi(CH₃)₂OSi(CH₃)₂H; HSi(CH₃)₂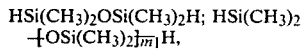H, with M₁ having the values 4, 6, 85, 125, 178 or 230;

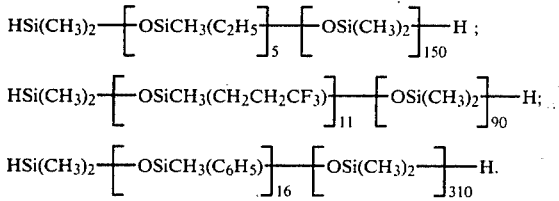

The amounts of the polymers of the formula F₂ and the α,ω-dihydrogenopolydiorganosiloxanes employed are such that the molar ratio of the number of vinyl groups supplied by the polymers/number of groups SiH supplied by the polysiloxanes ranges from 0.7 to 1.3, preferably from 0.9 to 1.1.

The block copolymers resulting from this hydrosilylation reaction are terminated at each end of their chain by groups SiH and/or Si—CH=CH₂. However, it is possible to have yet other blocking groups by introducing, during the hydrosilylation reaction, organosilicon compounds bearing a SiH group, such as trimethylmonohydrogenosilane, or organic or organosilicon compounds containing a vinyl radical, such as styrene or trimethylvinylsilane.

This hydrosilylation reaction, which leads to a polyaddition of the 2 reactants, is catalyzed by metals of group VIII of the Periodic Table of elements, or by the inorganic or organic derivatives thereof. Among such metals, there are mentioned platinum, palladium, ruthenium, rhodium and iridium, as illustrative.

The use of platinum is recommended and same can be introduced in the form of elementary platinum deposited on various supports (alumina, silica or carbon black) or, preferably, in the form of its chlorides, such as those of the formulae; Cl₂Pt, Cl₄Pt and H₂PtCl₆.6H₂O. Moreover, these chlorides can be modified by reacting same with suitable organic compounds; thus, there are mentioned, on the one hand, products resulting from the reaction of chloroplatinic or hexachloroplatinic acid with alcohols, ethers or aldehydes (U.S. Pat. No. 3,220,972), and, on the other hand, the complexes formed between platinous chlorides and olefins (U.S. Pat. No. 3,159,601) or phosphines or alkyl sulfides.

The amounts required of such catalysts are low, namely, on the order of 0.5 to 30 parts by weight, based on the metal, per million parts by weight of reactants (polymers of the formula F₂+α,ω-dihydrogenopolydiorganosiloxanes employed).

The polyaddition reaction is preferably carried out in solutions containing suitable diluents. Premature precipitation of polymers and bubbling of the reaction mixtures are thus avoided.

The diluents advantageously employed are selected from among: aliphatic and cycloaliphatic hydrocarbons which either may or may not be halogenated, such as pentane, hexane, heptane, chloroform, dichloroethane, tetrachloroethane, trichloroethylene, perchloroethylene, methyl chloride, cyclohexane, methylcyclohexane and decalin, aromatic hydrocarbons which either may or may not be halogenated, such as toluene, xylene, tetralin, chlorobenzene and ortho-dichlorobenzene, and aliphatic esters of monocarboxylic acids, such as ethyl, butyl and amyl acetates.

The proportion of the diluents in the solutions can vary and depends, for example, on the solubility of the starting materials and of the copolymers formed; however, such solutions preferably contain from 25 to 75% by weight of diluents, and more preferably from 35 to 65%.

The reaction temperature must be sufficient to effect the polyaddition of the copolymers. This temperature is typically in the range of 80° C. to 220° C. The reaction time is a function of the nature of the reactants and of the catalyst and a function of the temperature at which the reaction is carried out. It can range from 30 minutes to about thirty hours.

After the completion of the polyaddition reaction, which can be determined analytically by the disappearance of the groups SiH and Si—CH=CH₂, the copolymers of the formula F are precipitated by diluting their reaction medium with compounds in which they are sparingly soluble or insoluble.

The technique employed in analogous to that described above, in the 2nd stage, for the separation of the polymers of the formula F₂.

The copolymers, which correspond to the abovementioned formula F, are then filtered off, washed and dried. They are solids having softening points on the order of 150°–250° C. The molecular weights of these copolymers depends on the abovementioned molar ratio, namely, number of groups SiCH=CH₂ supplied by the polymers/number of groups SiH supplied by the dihydrogenopolydiorganosiloxanes, and also on the course of the polyaddition reaction; they can range from 20,000 to 2 million.

These copolymers are thermoplastic elastomers of which the elastomeric properties depend mainly on the nature and the weight ratio of the polystyrene blocks and of the diorganopolysiloxane blocks constituting each unit.

However, it is recommended to manufacture copolymers having from 30 to 85% by weight of diorganopolysiloxane blocks. If this percentage is low, namely, between 30 and 40%, the copolymers have good mechanical properties which are approximately the same as those of the purely organic polymers or copolymers. On the other hand, if this percentage exceeds 45–50%, the mechanical properties of the copolymers are not as good, but are nevertheless superior to those of the conventional organopolysiloxane elastomers.

These copolymers are characterized by good temperature resistance which is superior to that exhibited by the purely styrene polymers. In fact, their modulus of elasticity varies only slightly over a range of temperatures from ambient temperatures to temperatures exceeding 100° C.

These copolymers can be converted to gaskets, profiles, insulating or protective coverings, or solid fibers, using the techniques of the rubber industry or those of the plastics-converting industry. Such articles can be used in numerous industrial fields, such as the automotive and electrotechnical industries.

Moreover, since such copolymers comprise diorganopolysiloxane blocks, same have a good permeability to gases. They can, therefore, be used for the preparation of membranes having a selective permeability to gases (for example, as artificial lungs) or for separating out at least one of the constituents of gaseous mixtures. Being physiologically inert, they can also be used for manufacture of prostheses destined for contact with human tissues (for example, as catheters, various implants and heart valves).

It is possible to incorporate in the subject copolymers, at the rate of at most 100% of their weight, pulverulent fillers selected from among the various kinds of silica, calcined clays, carbon blacks, metal oxides, alkali metal carbonates and alkaline earth metal carbonates, and magnesium silicate, aluminum silicate or zirconium silicate.

In order to further illustrate the present invention and the advantages thereof, the following specific examples are given, it being understood that same are intended only as illustrative and in nowise limitative. In all of the examples which follow, the tetrahydrofuran was purified by distillation in the presence of the benzophenone-sodium complex and the toluene was purified by distillation over sodium wire.

EXAMPLE 1

(i) 500 cm$^3$ of tetrahydrofuran and 40 cm$^3$ of a solution of an initiator based on the dipotassium tetramer of α-methylstyrene [the preparation of this solution is described below in part (ii)] were introduced into a reactor having a capacity of 1,000 cm$^3$, which was equipped with a stirrer and a thermometer sleeve and protected from the atmosphere by the passage of a slow stream of anhydrous argon.

The contents of the reactor were cooled to a temperature of −63° C. 50 g of vinylmesitylene of the formula:

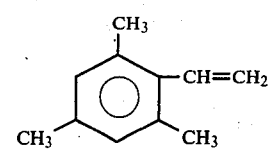

were introduced therein over a period of 17 minutes. When the addition was complete, the temperature had reached −60° C. The reaction mixture was then left to stand for 2 hours at this temperature.

The mixture was then cooled to −70° C., and 8 cm$^3$ of dimethylvinylchlorosilane of the formula $CH_2=CH(CH_3)_2SiCl$ were introduced over a period of 3 minutes. This volume corresponds approximately to 4 times the number of g-atoms of chlorine required to neutralize the g-atoms of potassium present in the reaction mixture. A decoloration of the mixture was observed as soon as the first drops of dimethylvinylchlorosilane were introduced.

After the addition of the silane was complete, the mixture was allowed to return to ambient temperature and poured into 4 liters of stirred methanol. A whitish product precipitated. Same was isolated by filtration and washed 2 times with 100 cm$^3$ of methanol. It was then placed for 2 hours in an oven heated to a temperature of 50° C., in which there existed a pressure of 20 millibars. 50 g of a whitish solid polymer were collected. Analysis was carried out on the polymer using exclusion-diffusion chromatography on silica gel and revealed the number average and weight average molecular weights below (the standardization being carried out with calibrated samples of polystyrene): $\overline{Mn}=6,100$, $\overline{Mw}=6,500$, i.e., a ratio of $\overline{Mw}/\overline{Mn}$ of 1.07.

The polymer thus corresponded to the average general formula:

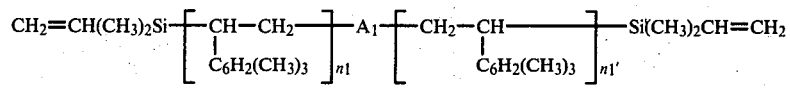

in which $A_1$ represents the skeleton of the initiator, having the likely formula:

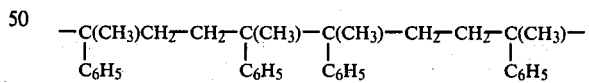

and the sum of $n_1+n'_1$ had the mean value of 37.4.

(ii) 150 cm$^3$ of tetrahydrofuran and 3.9 g of potassium were introduced into a reactor having a capacity of 250 cm$^3$, which was equipped with a stirrer and protected from the atmosphere by the passage of a slow stream of anhydrous argon. 14 cm$^3$ of α-methylstyrene were added to the contents of the reactor and the entire mass was left standing at a temperature of 20° C.

The resulting solution was not used until it had been standing for 48 hours at a temperature of 20° C.; it had a normality of about 0.36 as determined using acetanilide. Consequently, it contained the dipotassium tetramer of α-methylstyrene at a concentration of approximately 0.18 mol in 1,000 cm$^3$ of solution, the tetramer having the likely formula:

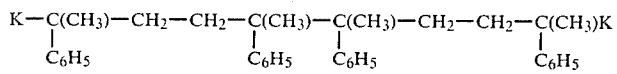

EXAMPLE 2

500 cm³ of tetrahydrofuran and 45 cm³ of the solution (prepared as indicated in part (ii) of Example 1) of the dipotassium tetramer of α-methylstyrene were introduced into the reactor employed in part (i) of Example 1.

The contents of the reactor were cooled to −64° C. 50 g of α-methylstyrene were introduced therein over a period of 15 minutes. When the addition was complete, the temperature of the mixture had reached −58° C.; same was adjusted to −65° C. and the mixture was left standing at this temperature for 1 hour.

The mixture was then cooled to −95° C. which caused it to thicken due to the supercooling of the tetrahydrofuran. 8 cm³ of dimethylvinylchlorosilane were then added thereto over a period of 3 minutes. After the addition of the silane was complete, the contents of the reactor were allowed to return to ambient temperature and then poured into 4 liters of methanol. A whitish product precipitated.

After filtration, washing with methanol and drying, 50 g of a whitish solid polymer were collected.

The analysis carried out on the copolymer using exclusion-diffusion chromatography on silica gel revealed the number average and weight average molecular weights below: $\overline{Mn}=5,400$; $\overline{Mw}=5,830$; i.e., a ratio of $\overline{Mw}/\overline{Mn}$ of 1.08.

The copolymer thus corresponded to the average general formula:

$$CH_2=CH(CH_3)_2Si\left[\begin{array}{c}-C(CH_3)-CH_2-\\|\\C_6H_5\end{array}\right]_{n2}-A_1-\left[\begin{array}{c}-CH_2-C(CH_3)-\\|\\C_6H_5\end{array}\right]_{n2'}Si(CH_3)_2CH=CH_2$$

in which the sum of $n_2+n'_2$ had the mean value of 40.9 and $A_1$ had the meaning indicated above in relation of the formula of the polymer of Example 1, part (i).

EXAMPLE 3

400 cm³ of tetrahydrofuran and 22 cm³ of the solution (prepared as indicated in part (ii) of Example 1) of the dipotassium tetramer of α-methylstyrene were introduced into the reactor used in part (i) of Example 1.

The contents of the reactor were cooled to −63° C.; 40 g of styrene were then introduced therein over a period of 18 minutes. When the addition was complete, the temperature of the mixture had reached −53° C. The mixture was maintained at this temperature for 15 minutes. The temperature was then lowered to −85° C. and 4 cm³ of dimethylvinylchlorosilane were introduced into the reactor. The mixture was instantaneously decolorized.

After the addition of the silane was complete, the contents of the reactor were allowed to return to ambient temperature and poured into 3.5 liters of methanol. After filtration, washing with methanol and drying, about 40 g of a whitish solid polymer were collected.

The analysis carried out on the polymer using exclusion-diffusion chromatography on silica gel revealed the number average and weight average molecular weights below: $\overline{Mn}=10,500$; $\overline{Mw}=12,100$; i.e., a ratio of $\overline{Mw}/\overline{Mn}$ of 1.14.

The polymer thus corresponded to the average formula:

$$CH_2=CH(CH_3)_2Si\left[\begin{array}{c}-CH-CH_2-\\|\\C_6H_5\end{array}\right]_{n3}-A_1-\left[\begin{array}{c}-CH_2-CH-\\|\\C_6H_5\end{array}\right]_{n3'}Si(CH_3)_2CH=CH_2$$

$n_3+n'_3=94.8$ and $A_1$ had the meaning already indicated in Example 1, part (i).

EXAMPLE 4

350 cm³ of tetrahydrofuran and 35 cm³ of the solution (prepared as indicated in part (ii) of Example 1) of the dipotassium tetramer of α-methylstyrene were introduced into the reactor used in part (i) of Example 1.

The contents of the reactor were cooled to −68° C.; 35 g of para-dimethylaminostyrene of the formula:

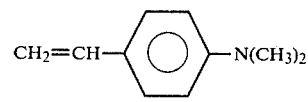

were introduced therein over a period of 15 minutes. When the addition was complete, the temperature of the mixture had reached −63° C.; same was maintained at this level for 30 minutes.

The temperature was then lowered to −97° C. and 7 cm³ of dimethylvinylchlorosilane were introduced into the reactor over a period of 3 minutes. The contents of the reactor were allowed to return to ambient temperature and poured into 3.5 liters of stirred methanol, containing 10 cm³ of an aqueous solution of ammonia (density=0.92).

After filtration, washing with methanol and drying, about 33.7 g of a solid copolymer were collected.

The analysis carried out on the copolymer using exclusion-diffusion chromatography on silica gel revealed the number average and weight average molecule weights below: $\overline{Mn}=5,100$; $\overline{M}^-=6,100$; i.e., a ratio of $\overline{Mw}/\overline{Mn}$ of 1.2.

The copolymer thus corresponded to the average formula:

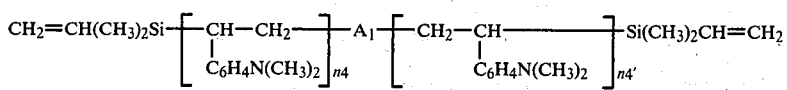

$n_4 + n'_4 = 30.3$; $A_1$ had the meaning already indicated in Example 1, part (i).

EXAMPLE 5

10 g of the difunctional polymer $F_2$, obtained from vinylmesitylene in accordance with part (i) of Example 1 ($\overline{Mn} = 6,100$), 15.25 g of an $\alpha,\omega$-dihydrogenopolydimethylsiloxane having a number average molecular weight of 9,300, and 25 g of toluene, were introduced into a reactor having a capacity of 250 cm$^3$, which was equipped with a stirrer and protected from the atmosphere by the passage of a slow stream of argon.

The heterogeneous milky mixture was heated to 95° C.; 0.045 cm$^3$ of a solution of hexachloroplatinic acid ($H_2PtCl_6 \cdot 6H_2O$), containing 3.76 mg of platinum/cm$^3$, was then introduced into the reactor.

The mixture was maintained at about 95° C. for 5 hours; it became homogeneous about 5 minutes after the addition of the solution of chloroplatinic acid.

The contents of the reactor, cooled to about 20° C., were diluted by adding 200 cm$^3$ of toluene; same were then slowly poured into 3 liters of stirred methanol.

A whitish product precipitated in the form of long fibers; same was filtered off, washed with methanol (2 times, 80 cm$^3$) and dried for 2 hours in an oven heated to a temperature of 90° C., in which there existed a pressure of 20 millibars.

25 g of a copolymer having an intrinsic viscosity of 56.6 cm$^3$/g, measured at 25° C. in tetrahydrofuran, were thus collected.

The analysis carried out on the copolymer using exclusion-diffusion chromatography on silica gel revealed the number average and weight average molecular weights below: $\overline{Mn} = 55,000$; $\overline{Mw} = 140,000$; i.e., a ratio of $\overline{Mw}/\overline{Mn}$ of 2.5.

The units constituting this copolymer essentially corresponded to the general formula:

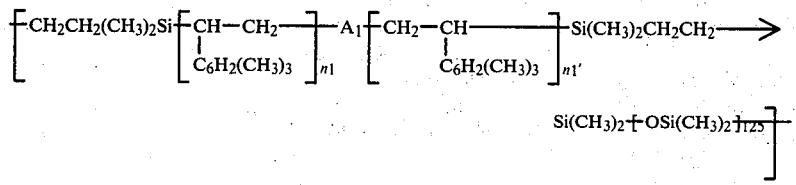

$n_1 = n'_1 = 37.4$; $A_1$ had the meaning already indicated in Example 1, part (i).

Several batches of the copolymer were placed in molds in which they were heated at 210° C. under a pressure of 50 bars for 5 minutes. This resulted in the formation of rubbery plates which possessed the following mechanical properties:

Breaking strength (according to French Standard Specification T 46,002) = 105 kg/cm$^2$;

Elongation at break (according to the same standard specification) = 690%.

EXAMPLE 6

10 g of the difunctional polymer $F_2$, obtained from vinylmesitylene in accordance with part (i) of Example 1 ($\overline{Mn} = 6,100$), 28.03 g of an $\alpha, \omega$-dihydrogenopolydimethylsiloxane ($\overline{Mn} = 17,100$) and 38 g of toluene were introduced into a reactor having a capacity of 250 cm$^3$, which was equipped as described in Example 5.

The heterogeneous mixture was heated to 95° C.; 0.045 cm$^3$ of the solution of hexachloroplatinic acid used in Example 5 was then added thereto. The mixture was then maintained at a temperature of 95° C. for 5 hours. It became homogeneous after heating for 15 minutes at this temperature. Same was cooled to about 15° C. and then diluted by adding 304 cm$^3$ of toluene. The entire mass was poured slowly into 4 liters of methanol.

A product precipitated in the form of long fibers; same was treated in accordance with the process indicated in the preceding example, namely, by filtration, washing with methanol and drying.

38 g of a copolymer having an intrinsic viscosity of 71.2 cm$^3$/g, measured at 25° C. in tetrahydrofuran, were collected.

Analysis carried out using exclusion-diffusion chromatography on silica gel revealed the number average and weight molecular weights below: $\overline{Mn} = 76,000$ $\overline{Mw} = 270,000$; i.e., a ratio of $\overline{Mw}/\overline{Mn}$ of 3.5.

The units constituting this copolymer essentially correspond to the general formula below:

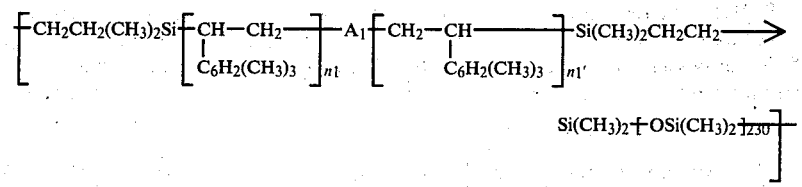

$n_1 + n'_1 = 37.4$; $A_1$ had the meaning already indicated in Example 1, part (i).

Rubbery plates, based on the copolymer, were prepared by following the hot molding process described in the preceding example. These plates possessed the following mechanical properties:

Breaking strength: 64 kg/cm$^2$;
Corresponding elongation: 930%.

EXAMPLE 7

The principle of the procedure of Example 6 was followed. 10 g of the difunctional polymer F$_2$, obtained from methylstyrene in accordance with Example 2 (M$\bar{n}$=5,400), 11.85 g of an α,ω-dihydrogenopolydimethylsiloxane (M$\bar{n}$=6,400) and 22 g of toluene were introduced into the reactor.

0.05 cm$^3$ of the solution of hexachloroplatinic acid used in Example 5 was added to the contents of the reactor, heated to 95° C. The mixture was maintained at 95° C. for 5 hours and then diluted by adding 176 cm$^3$ of toluene.

The entire mass, cooled to about 20° C., was run into 2.5 liters of methanol. A product precipitated. After filtration, washing with methanol and drying, 22 g of a solid copolymer having an intrinsic viscosity of 44.2 cm$^3$/g, measured at 25° C. in tetrahydrofuran, were collected.

Analysis carried out on this copolymer using exclusion-diffusion chromatography on silica gel revealed the number average and weight average molecular weights below: M$\bar{n}$=37,000 M$\bar{w}$=97,000; i.e., a ratio of M$\bar{w}$/M$\bar{n}$ of 2.6.

The units constituting this copolymer essentially corresponded to the general formula:

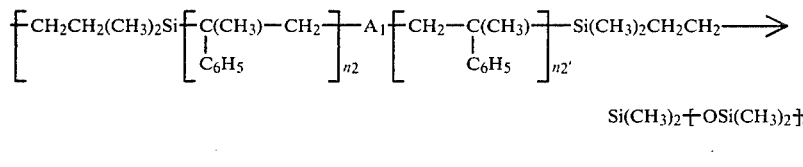

n$_2$+n'$_2$=40.9; A$_1$ had the meaning already indicated in Example 1, part (i).

Rubbery plates, based on the copolymer, were prepared by the hot molding process described in Example 5. Same possessed a breaking strength of 124 kg/cm$^2$, and a corresponding elongation of 380%.

EXAMPLE 8

The principle of the procedure of Example 6 was followed and 10 g of the difunctional polymer F$_2$, obtained from styrene in accordance with Example 3 (M$\bar{n}$=10,500), 12.62 g of an α,ω-dihydrogenopolydimethylsiloxane having a number average molecular weight of 13,250 and 23 g of toluene, was introduced into the reactor.

0.025 cm$^3$ of the solution of hexachloroplatinic acid used in Example 5 was added to the contents of the reactor, heated to 95° C. The heterogeneous milky mixture was maintained at 95° C. for 16 hours and then diluted by adding 180 cm$^3$ of toluene. The entire mass, cooled to about 20° C., was run into 2.5 liters of methanol. A whitish product precipitated.

After filtration, washing and drying, 22 g of a solid product were collected.

Analyses carried out on this copolymer using exclusion-diffusion chromatography on silica gel revealed the number average and weight average molecular weights below: M$\bar{n}$=50,000 M$\bar{w}$=300,000; i.e., a ratio of M$\bar{w}$/M$\bar{n}$ of 6.

The units constituting this copolymer essentially corresponded to the general formula:

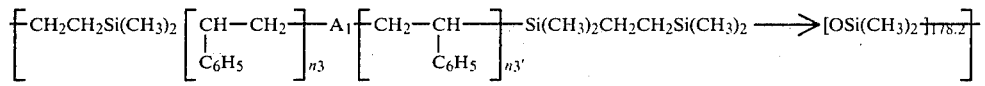

n$_3$+n'$_3$=94.8; A$_1$ had the meaning already indicated in Example 1, part (i).

Rubbery plates, based on the copolymer, were prepared by the hot molding process described in Example 5. Same possessed a breaking strength of 76 kg/cm$^2$, and a corresponding elongation of 350%.

EXAMPLE 9

The principle of the procedure of Example 6 was followed and 20 g of the difunctional polymer F$_2$, obtained from the p-dimethylaminostyrene in accordance with Example 4 (Mn=5,100), 37.20 g of an α,ω-dihydrogenopolydimethylsiloxane having a number average molecular weight of 9,300 and 56 g of toluene, were introduced into the reactor.

0.104 cm$^3$ of the solution of hexachloroplatinic acid used in Example 5 was added to the contents of the reactor, heated to 95° C. The milky mixture was maintained at 95° C. for 20 hours; an additional 0.100 cm$^3$ of the above solution of hexachloroplatinic acid was then added and the temperature was maintained at 95° C. for a further 8 hours.

The entire mass was diluted by adding 455 cm$^3$ of toluene and then run into 4 liters of methanol, containing 12 cm$^3$ of an aqueous solution of ammonia having a density of 0.92. A whitish product precipitated. After filtration, washing and drying, 55.15 g of a copolymer having a softening point of 200° C. were collected.

Analyses carried out on the copolymer using exclusion-diffusion chromatography on silica gel revealed the number average and weight average molecular weights below: M$\bar{n}$=80,000 M$\bar{w}$=330,000; i.e., a ratio of M$\bar{w}$/M$\bar{n}$ of 4.1.

The units constituting this copolymer essentially correspond to the general formula:

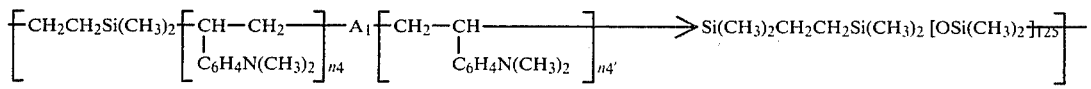

$n_4+n'_4=30.3$; $A_1$ had the meaning already indicated in Example 1, part (i).

Rubbery plates, based on the copolymer, were prepared in accordance with the hot molding process described in Example 5. Same possessed a breaking strength of 50 kg/cm$^2$, and a corresponding elongation of 160%.

After ten minutes the mixture was homogeneous. The entire time for the reaction was 18 hours.

The copolymer precipitated by pouring into methanol. After filtration, washing and drying, the copolymer was collected.

$M\bar{w}=107,000$

Its recurring units were:

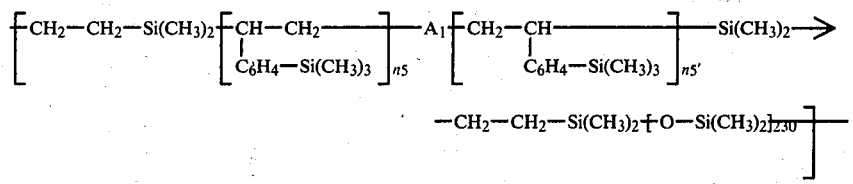

with $n_5+n'_5=58$.

EXAMPLE 10

According to the procedure of Example 1, 14.3 g of p-(trimethylsilyl)styrene (obtained by reaction of chlorotrimethylsilane and p-bromostyrene with magnesium) were introduced into a solution consisting of 150 ml of THF and 7 ml of a solution of the dipotassium α-methylstyrene tetramer (0.206 N). When the polymerization was complete, the mixture was cooled to $-85°$ C. and 1 cm$^3$ of chlorodimethylvinylsilane was added.

By precipitation with methanol and after filtration, washing and drying, 14.2 g of poly(trimethyl vinyl-4'-phenyl)silane were collected.

The analysis carried out using exclusion-diffusion chromatography on silica gel revealed the number average and weight average molecular weights below:

$M\bar{n}=10,500$
$M\bar{w}=10,900$
Softening point: 131° C.

EXAMPLE 11

According to the procedure of Example 1, 25 g of p-(trimethylsilyl)-α-methylstyrene (obtained by reaction of chlorotrimethylsilane and p-bromo-α-methylstyrene with magnesium) were introduced into a solution consisting of 250 ml of THF and 13.2 cm$^3$ of a solution of the dipotassium α-methylstyrene tetramer (0.210 N).

When the polymerization was complete the mixture was cooled to $-95°$ C. and 1.5 cm$^3$ of chlorodimethylvinylsilane were added.

The polymer was precipitated with methanol and then washed and dried; 25 g of poly(trimethyl-(isopropenyl-4'-phenyl)-silane) were collected.

$M\bar{n}=9,200$.

Softening point: 159° C.

The polymer thus corresponded to the average formula:

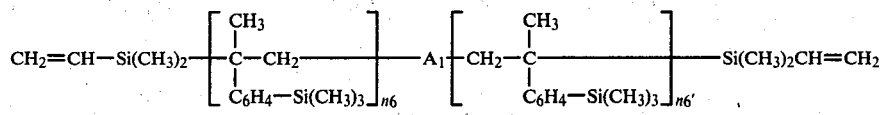

The polymer thus corresponded to the average formula:

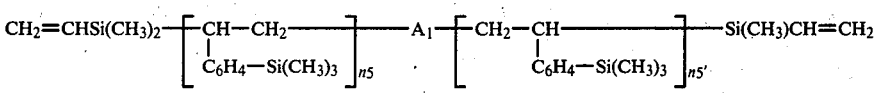

with $n_5+n'_5=58$ and $A_1$ being the skeleton of the α-methylstyrene tetramer.

The copolymer was then prepared according to the procedure of Example 5; 5 g of the formed "polystyrene" and 8.55 g of α,ω-dihydrogenopolydimethylsiloxane (having a number average molecular weight of 17,100) were introduced in 16 cm$^3$ of toluene. The mixture was heated to 95° C. and 0.025 ml of a solution of hexachloroplatinic acid containing 10 g/l in isopropanol was added.

with $n_6+n'_6=45$, and $A_1$ being the skeleton of the α-methylstyrene tetramer.

The copolymer was then prepared according to the procedure of Example 5; 10 g of the substituted "polystyrene" and 19 g of the same α,ω-dihydrogenopolydimethylsiloxane of Example 10, were introduced into 33 cm$^3$ of toluene.

The mixture was homogeneous after 15 minutes. The entire time of reaction was 4 hours.

100% of the copolymer were recovered:

$M\bar{w}=180,000$.

The copolymer obtained after methanol filtration, washing and drying, corresponded to the average formula:

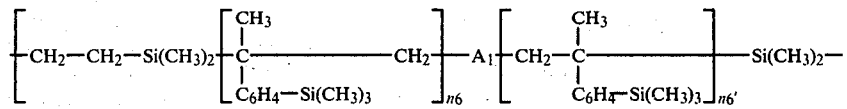

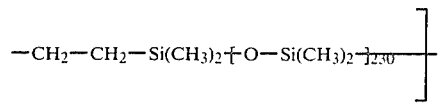

with $n_6+n'_6=45$.

Rubbery plates, based on the copolymer, were prepared in accordance with the hot molding process of Example 5. Same possessed a breaking strength of 123 kg/cm², and a corresponding elongation of 786%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A thermoplastic, elastomeric polystyrene/diorganopolysiloxane block copolymer comprising a plurality of recurring units having the structural formula:

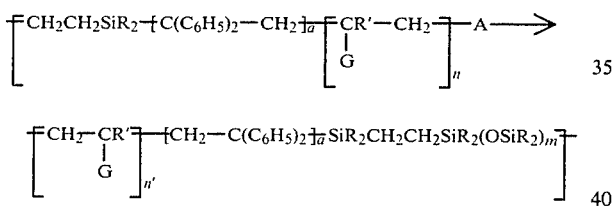

wherein each R, which may be the same or different, is selected from the group consisting of methyl, ethyl, n-propyl, phenyl and 3,3,3-trifluoropropyl; each R', all of which are the same, is hydrogen or methyl; A is a divalent hydrocarbon radical, free of aliphatic unsaturation, having from 6 to 45 carbon atoms; each G, which may be the same or different, is a radical selected from the group consisting of those of the structural formulae:

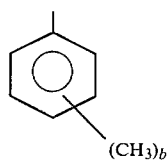

wherein b is 0, 1, 2 or 3,

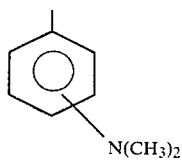

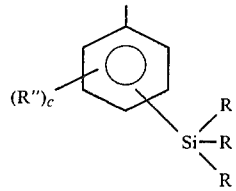

wherein R" is hydrogen, methyl or —Si R₃, c is 0, 1 or 2 and R is as above defined; each a, all of which are the same, is 0 or 1; and n and n', which may be the same or different, represent any numbers, the sum of which is between 20 and 500, and m is any number between 1 and 1,500.

2. The thermoplastic, elastomeric block copolymer as defined by claim 1, wherein A is selected from the group consisting of naphthylene, biphenylene, alkylene, polyalkylene, and aromatically substituted alkylene and polyalkylene.

3. The thermoplastic, elastomeric block copolymer as defined by claim 2, wherein A is selected from the group consisting of naphth-1,5-ylene, and an α-methylstyrene tetramer having one of the structural formulae:

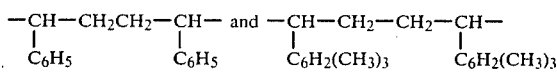

4. The thermoplastic, elastomeric block copolymer as defined by claims 1, 2 or 3, wherein G is a member selected from the group consisting of phenyl, trimethylsilylphenyl, bis(trimethylsilyl)phenyl, and, when each R' is hydrogen, a radical selected from the group consisting of those of the structural formulae:

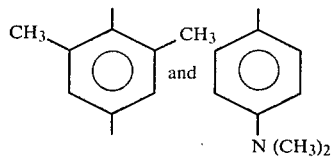

5. The thermoplastic, elastomeric block copolymer as defined by claim 4, wherein each a is 0.

6. The thermoplastic, elastomeric block copolymer as defined by claim 4, wherein n and n' represent numbers, the sum of which is between 30 and 400.

7. The thermoplastic, elastomeric block copolymer as defined by claim 6, wherein m varies from 10 to 1,200.

8. A process for the preparation of a thermoplastic, elastomeric block copolymer as defined by claim 1, comprising (i) anionically polymerizing a monomer having the formula $C(G)(R')=CH_2$ in the presence of $A(M)_2$ initiator, wherein M is an alkali metal, resulting in a living polymer having the structural formula (F₁):

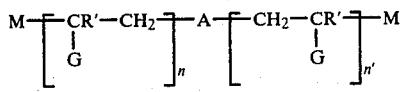 (F₁);

(ii) next reacting a member selected from the group consisting of (ii)(a) the living polymer having the structural formula (F₁) and (ii)(b) a living polymer having the structural formula (F₁'):

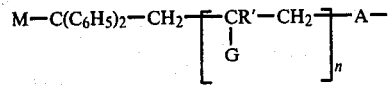

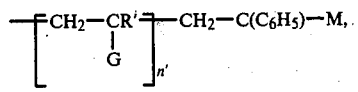

prepared by reacting the living polymer having the structural formula (F₁) with $C(C_6H_5)_2=CH_2$, in a molar ratio of at least 2 mols of $C(C_6H_5)_2=CH_2$ per mol of living polymer (F₁), with $CH_2=CH-R_2SiCl$, in a ratio of at least one mol of such vinylorganochlorosilane per gram-atom of alkali metal, resulting in a difunctional polystyrene polymer having the structural formula (F₂):

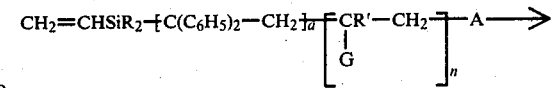

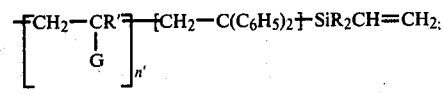

and (iii) thence hydrosilylating such polymer (F₂) with $HSiR_2-(OSiR_2)_mH$, in a ratio of the number of vinyl groups in the polymer (F₂) to the member of SiH groups in such dihydrogenodiorganopolysiloxane of between 0.7 and 1.3.

9. A shaped article comprising the thermoplastic, elastomeric block copolymer as defined by claim 1.

* * * * *